United States Patent [19]

Ebato

[11] Patent Number: 5,035,091
[45] Date of Patent: Jul. 30, 1991

[54] AUTOMATICALLY OPERATED OPENING AND CLOSING ROOF

[75] Inventor: Sakae Ebato, Tokorozawa, Japan

[73] Assignee: Kabushiki Kaisha Daimon, Saitama, Japan

[21] Appl. No.: 449,546

[22] Filed: Dec. 12, 1989

[30] Foreign Application Priority Data

Dec. 30, 1988 [JP] Japan ............................ 63-171478[U]

[51] Int. Cl.⁵ ................................................ E04B 7/16
[52] U.S. Cl. ............................................ 52/1; 52/66; 160/265; 160/268.1; 160/310
[58] Field of Search ................. 52/1, 66, 64; 160/310, 160/265, 268.1, 270, 271, 282, 285, 287

[56] References Cited

U.S. PATENT DOCUMENTS 4,348,833  9/1982  Nagoya ................................... 52/66

FOREIGN PATENT DOCUMENTS 2604203   3/1988  France .
57-136289 8/1982  Japan .
58-29087  2/1983  Japan .
58-105910 7/1983  Japan .
59-60222  4/1984  Japan .
60-10029  1/1985  Japan .
1573104   8/1080  United Kingdom .

Primary Examiner—Michael Safavi
Attorney, Agent, or Firm—Notaro & Michalos

[57] ABSTRACT

The present invention relates to an automatically operated opening and closing roof composed of a sheet or tarpaulin; a frame constituting the whole rim of the roof; a drum supported rotatably on the frame and holding an end of the sheet whereby allowing it to roll out and roll up the sheet; a slider holding the other end of the sheet and slidably supported by a guide rail which is mounted on the frame for allowing the slides to move toward and away from the drum; and an actuator mounted on the frame for driving the slider and/or the drum along the guide rail whereby covering over the frame with the sheet or uncovering the frame. A rain sensor for detecting rain, snow and other wetness; and a controller for switching the actuator on when a signal reaches it from the rain sensor are used for covering the sheet over the frame, and counter-switching the actuator when a reverse signal reaches the controller when the rain stops, thus uncovering the sheet from the frame. At least the actuator, the slider and the guide are housed within a watertight box.

8 Claims, 6 Drawing Sheets

AUTOMATICALLY OPERATED OPENING AND CLOSING ROOF

BACKGROUND OF THE INVENTION

1. Field of the Invention The present invention relates to an automatically operated opening and closing roof. More specifically the invention is directed to a roof for a veranda, a clothes-drying platform, a greenhouse, a roof top, a sun room, etc. where rain and other wet weather directly affect the things thereat, such as drying clothes, plants, etc. and yet, lighting and ventilation are desired.

2. Description of the prior Art

There are several references showing the opening and closing of a roof as seen, for example, in Japan Utility Model Laid-Open No. 58-105910. The prior art disclosed in said No. 58-105910 relates to a roof structure which is manually operated for opening and closing; the structure consisting of a motion transferring device carried by a plurality of internally associated rope rollers, a sheet coverable over the roof area when rolled out, a rotatory drum to roll out or roll up the sheet rotated by the motion transferring device, and handle to work the opening and closing roof structure.

Said roof structure features a ready and smooth opening and closing of the structure to obtain sun, ventilation and rainproofing. However, without a device that automatically opens and closes the roof area, the roof structure is useless for homes where all family members are absent from home in the daytime for work, etc. There are some other relevant structure disclosed in Japanese Utility Model Laid-Open 57-136289, 58-29087, 59-60222 and 60-10029.

SUMMARY OF THE INVENTION

The present invention, provided with a controlling means comprising a rain sensor, controller and actuator, can open and close the roof area automatically depending on either a wet or dry signal from the sensor for operating a switch of the controller. Thus the disadvantages and limitations of the prior art are readily obviated.

DESCRIPTION OF THE PREFERRED EMBODIMENTS OF THE INVENTION

Figure 1:
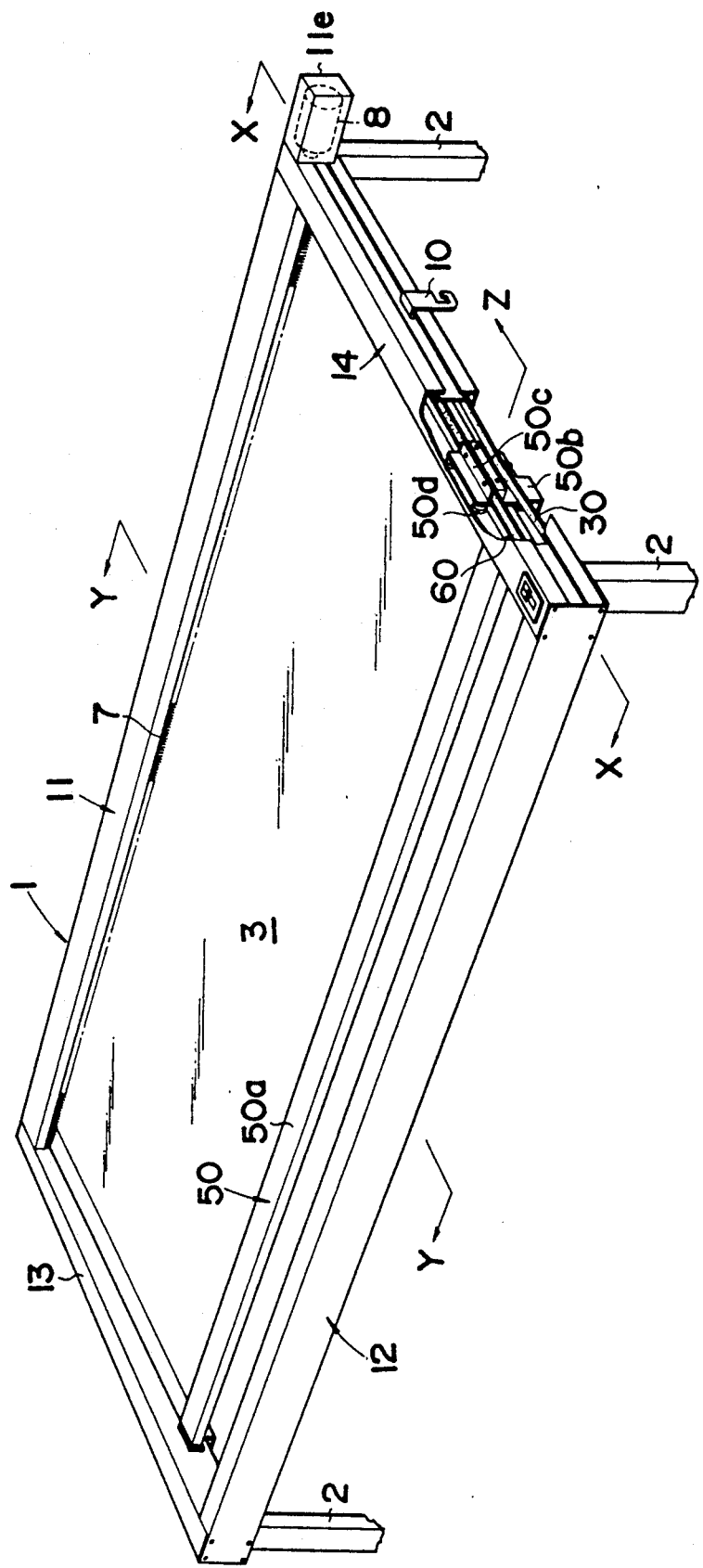
FIG. 1 shows a perspective view of an embodiment of the present invention in a partial sectional view.
Figure 2:
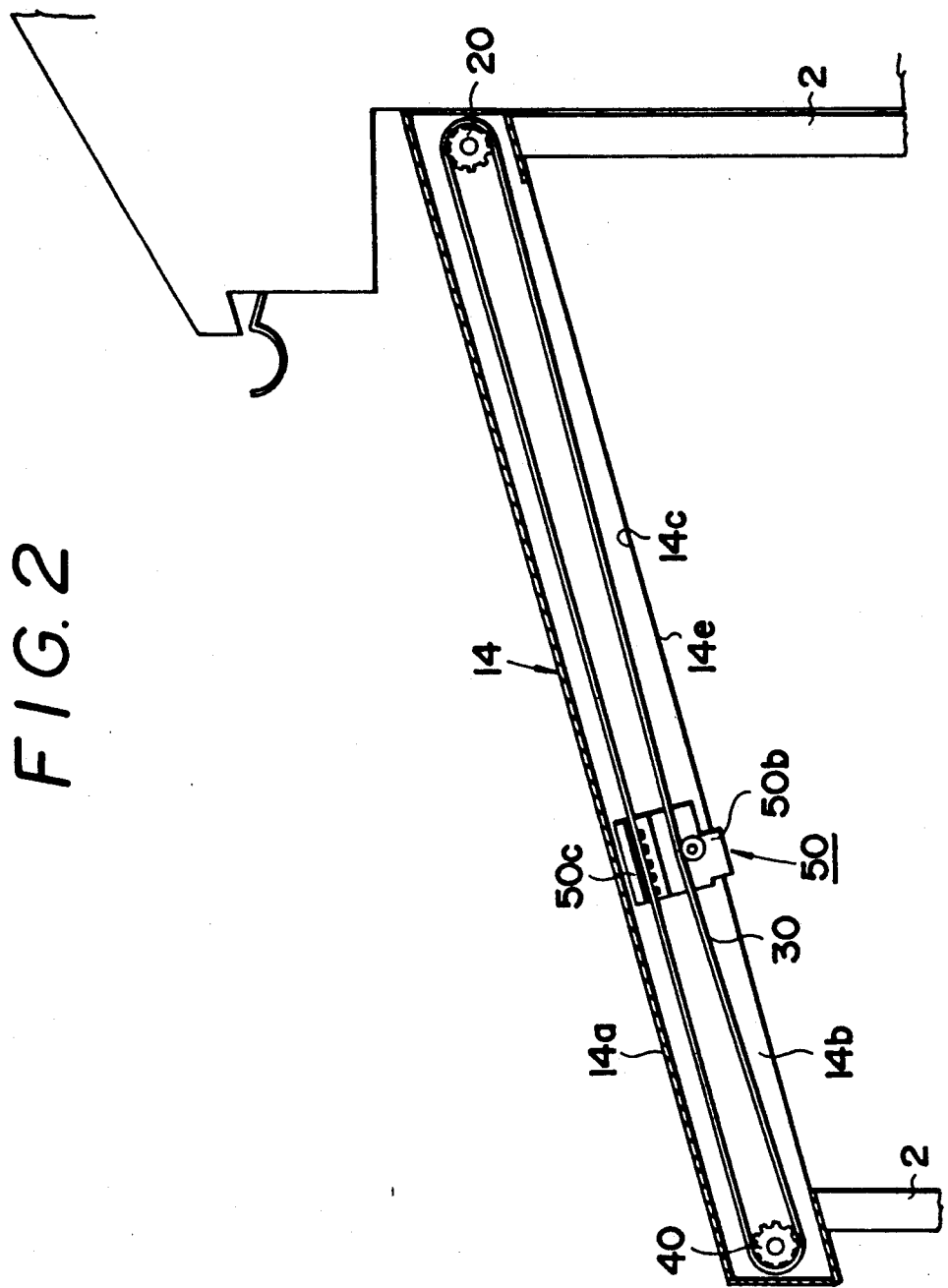
FIG. 2 shows an enlarged sectional view along the line X—X in FIG. 1.
Figure 2A:
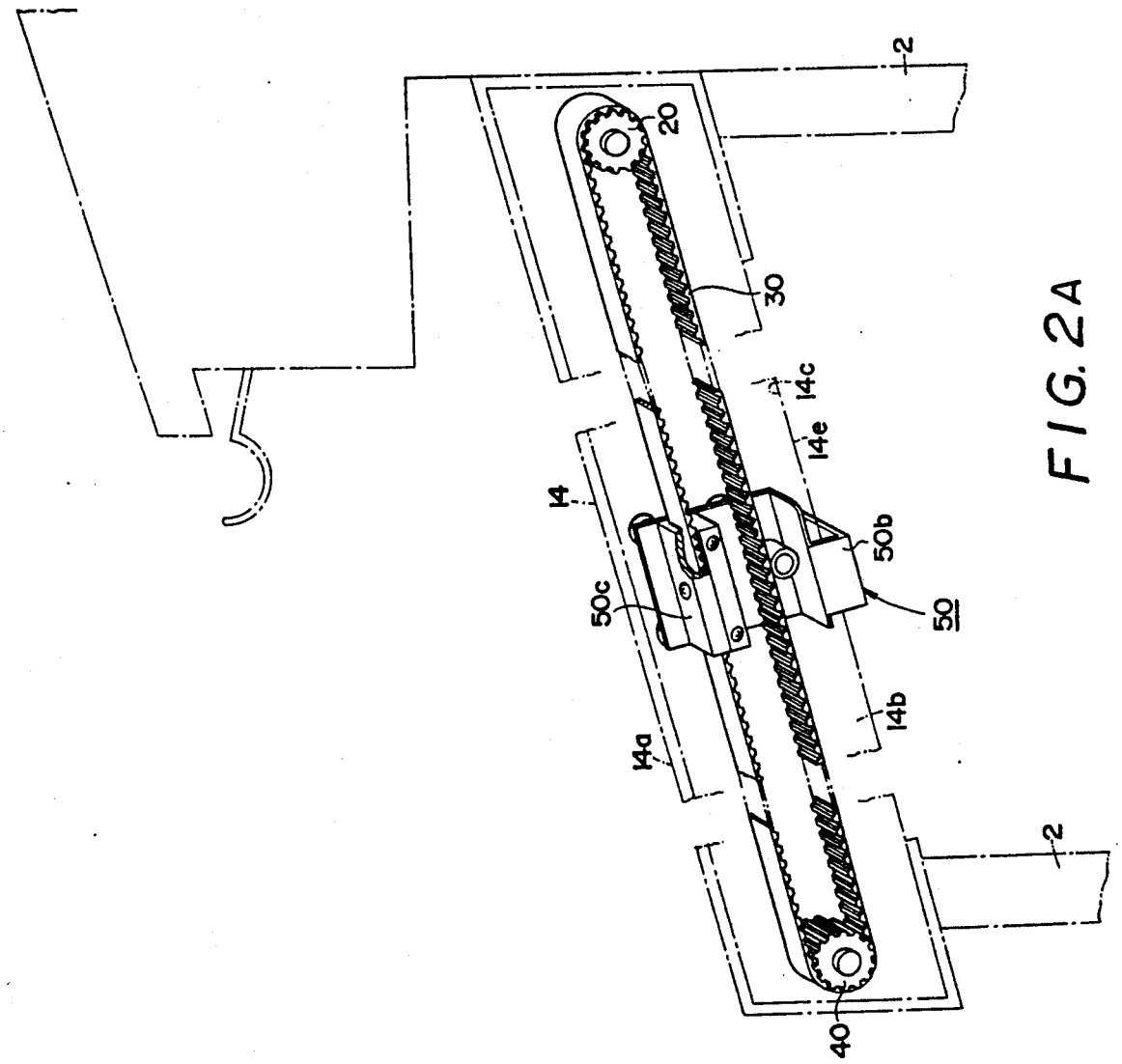
FIG. 2A is a perspective view corresponding to FIG. 2.

FIG. 1 shows a view of an embodiment of the present invention which covers a veranda. A frame 1 consists of an upper sidepiece 11, a lower sidepiece 12, a left crosspiece 13 and right crosspiece 14 to form a substantially rectangular inclined plane over a roof area. The four corners of the frame 1 are each supported by a supporter 2.

Figure 3:
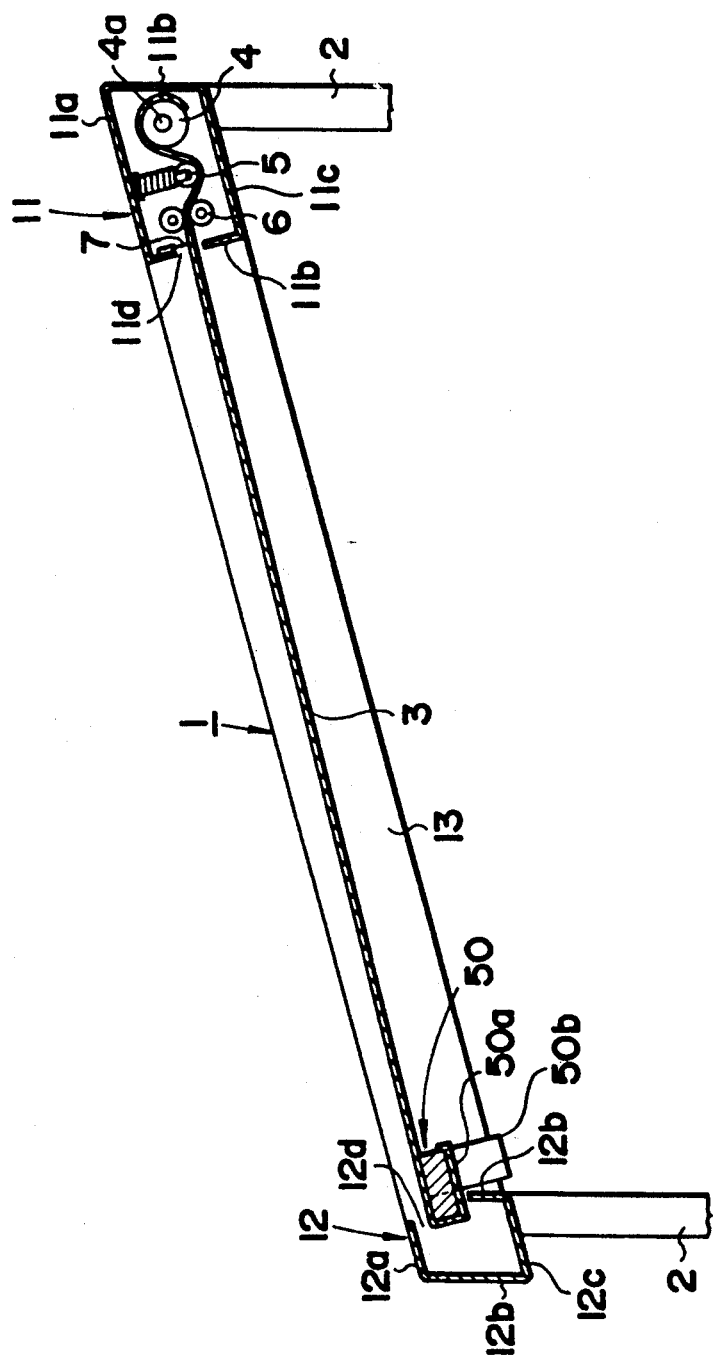
FIG. 3 shows an enlarged sectional view along the line Y—Y in FIG. 1.
Figure 4:
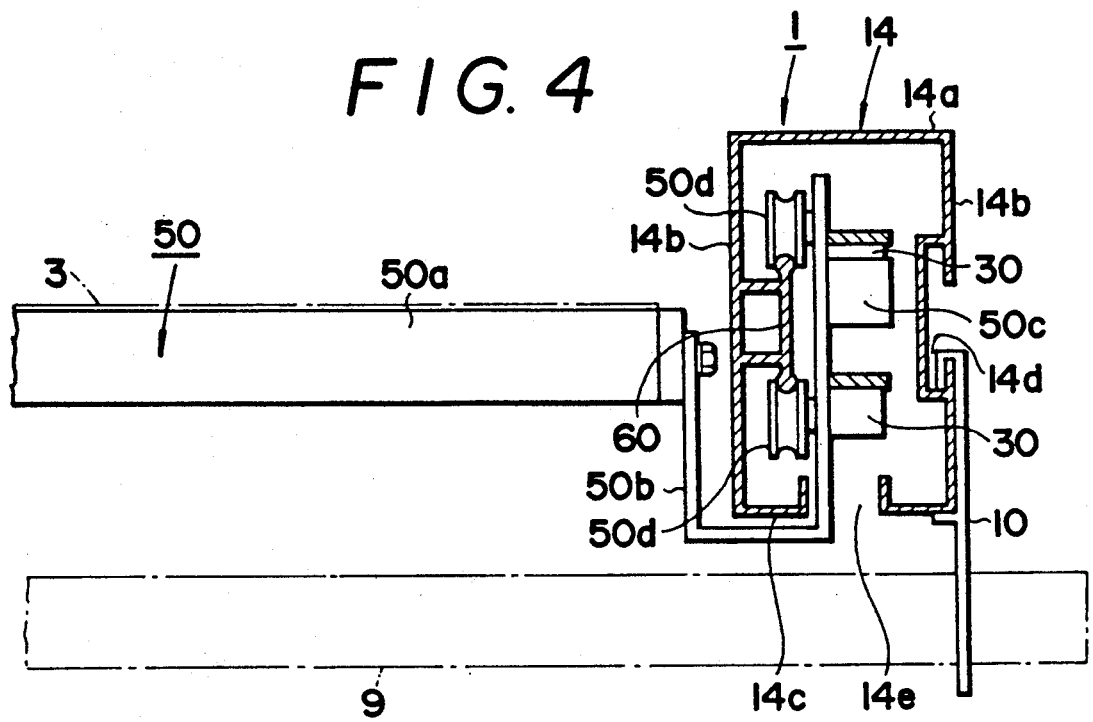
FIG. 4 shows an enlarged partial sectional view along the line Z—Z in FIG. 1.

The upper sidepiece 11 as shown in FIG. 3 is formed into a housing consisting of a top plate 11a, a bottom plate 11c and side plates 11b. The side plate 11b on the downward side facing to the lower sidepiece 12 has a slit 11d formed along the length direction of the upper sidepiece 11. The upper sidepiece 11 as shown in FIG. 1 is attached with a box 11e on the right side wherein a motor 8 is housed.

The upper sidepiece 11 is provided with a drum 4 that holds a edge of a tarpaulin 3 and rolls and unrolls the tarpaulin 3 by rotation. The drum 4 is supported by an axis 4a on the sides of the sidepiece 11. The tarpaulin 3, which, for example, is of synthetic resin material such as polyester reinforced with glass fiber, and is unrolled through the slit 11d to spread out over the roof area enclosed by the frame 1 which forms a substantial part of the roof structure. The upper sidepiece 11 further contains tension rollers 5 that prevent a sag of the unrolled tarpaulin 3 by pressing thereon by means of a coilspring, pairs of drain roller 6 that pres together from both sides of the tarpaulin 3 to squeeze off rain soaked thereinto, and a cleaning brush 7 that, attached at the slit 11d so that the brush tip touches the surface of the taupaulin 3, sweeps off the rain water and/or dust from the upper surface of taupaulin 3.

The lower sidepiece 12 as shown in FIG. 3 is also formed into a housing as the upper sidepiece 11 consisting of a top plate 12a, a bottom plate 12c and side plates 12b. An upper part of the side plate 12b on the upper side facing the upper sidepiece 11 is cut off so that a slender window 12d is formed along the length direction of the lower sidepiece 12. The lower sidepiece 12 functions by itself as a rain drainer, and is connected to a drainage (not shown in the drawings).

The right crosspiece 14 as shown in FIG. 1 to FIG. 4, is formed into a housing consisting of a top plate 14a, a bottom plate 14c and side plates 14b. The side plate 14b on the outer side, namely the side opposite to the side facing to the left crosspiece 13, has a groove 14d formed along the length direction of the right crosspiece 14 whereat a hook 10 may be held to support a wash-line pole 9. The bottom plate 14c has a gutter 14e formed along the length direction of the right crosspiece 14.

The right crosspiece 14 is, near the upper sidepiece 11, provided with a driving gear 20 which is connected to the motor 8 and is, near the lower sidepiece 12, provided with a following gear 40 that is driven by the driving gear 20 by means of a castellated endless belt 30 to a part of which is fixed a slider 50, to which, in turn, is fixed the other end of the taupaulin 3. The slider 50 runs on a guide rail 60 facilitated within the right crosspiece 14 along the castellated endless belt 30. The slider 50 consists of a lon9 body 50a that reaches from the left crosspiece 13 to the right crosspiece 14 and to that an end of the taupaulin 3 is fixed, a pair of connector 50b shaped letter "U" in its sectional view fixed at the both ends of the long body 50a so that an end of the connector 50b enters through the gutter 14e into the right crosspiece 14, a fixer 50c mounted to a side of the connector 50b that holds the castellated endless belt 30, wheels 50d that run along the guide rail 60 are facilitated on the other side of the connector 50b. The wheels 50d are mounted on the guide rail 60 like nipping the guide rail 60 from both sides lest they should run off therefrom. Thus the structure for moving the slider 50, in comparison with the that of the internally associated rope rollers, is much simpler than ever.

The left crosspiece 13, although not described in detail in the drawings, may have the same structure in contrast to the right crosspiece 14. However, said driving gear 20, the following gear 40, the endless belt 30 and the fixer 50c are not always necessary for the left crosspiece 13, if they are provided with the right crosspiece 14, and vice versa.

Figure 7:
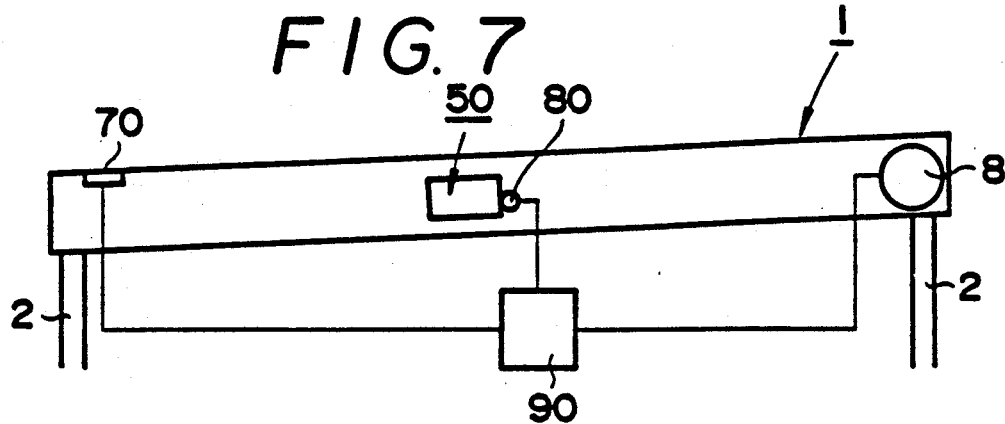
FIG. 7 shows a circuit diagram for controlling the motion of the roof structure of the present invention.

In addition to the above said mechanical structure, as shown in FIG. 7, the present embodiment also contains an electrically functioned structure consisting of a rain sensor 70, a position sensor 80 which detects the position of the slider 50 and a controller 90 which connects said rain sensor 70, said position sensor 80, and said motor 8.

Figure 5:
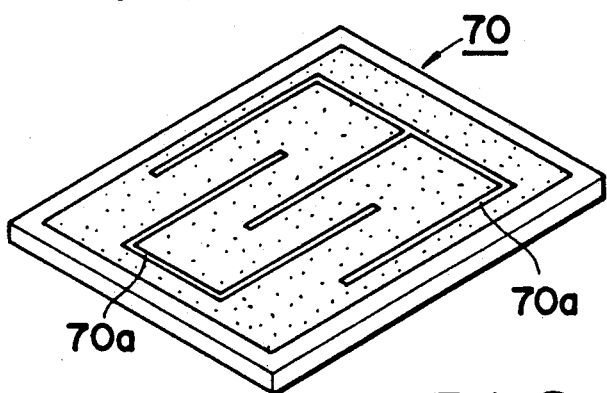
FIG. 5 shows a perspective view of an example of a rain sensor.
Figure 6:
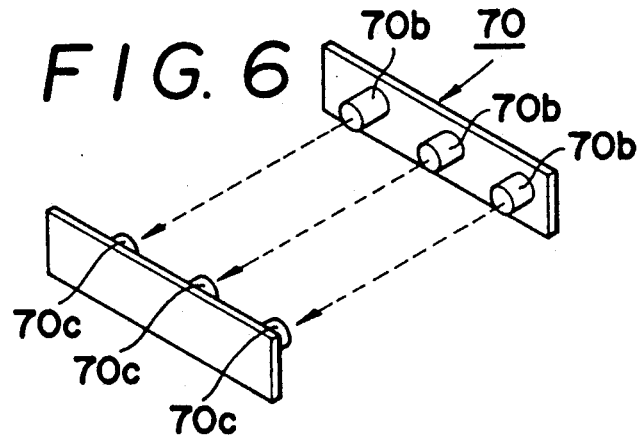
FIG. 6 shows a perspective view of another example of the rain sensor.

The rain sensor 70 is mounted on the frame 1 to detect rain which transmits signals of both rain and dry conditions. The rain sensor 70, as shown in FIG. 5 as for example, can be a detector having electric terminals 70a on a plate, the rain on which connects the electric terminals 70a whereby transmitting the raining signal and the dryness on which disconnects the electric terminals 70a whereby transmitting the drying signal, or as shown in FIG. 6, can be a detector having plural luminous elements 70b and receiving elements 70c.

The position sensor 80, which detects the position of the slider 50 or whether the tarpaulin 3 is rolled, can either be of optical, of electrical or of mechanical structure.

Figure 8:
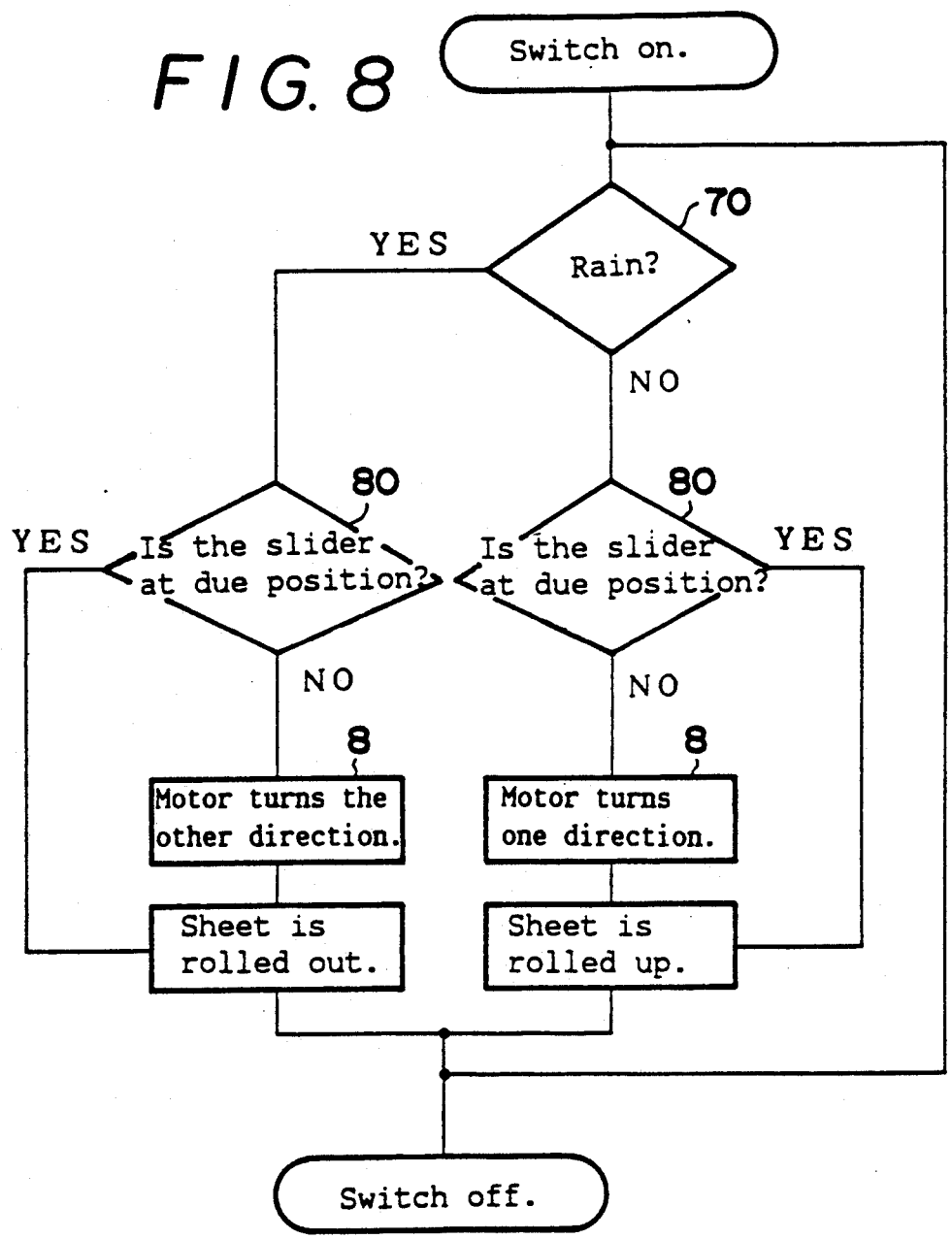
FIG. 8 shows a flow chart of the controlling motion of the one shown in FIG. 7.

The controller 90 transmits the signals sent by the rain sensor 70 and the position sensor 80 to the motor 8. As shown in FIG. 8, when the switch of the automatic control system is put on, first the rain sensor 70 detects whether it is raining or dry and then the position sensor 80 detects the position of the slider 50, and if the tarpaulin 3 is not unrolled over the roof area when it is raining or the tarpaulin 3 is not rolled from the roof area when it is dry, a signal to turn the motor 8 in reverse direction is transmitted.

The motor 8 is connected with said drum 4 and the driving gear 20 to turn these parts in such a manner as to rotate a fixed number of rotation times in one and the other direction, whereby moving the slider 50 back and forth from the upper sidepiece 11 or the lower sidepiece 12, thus rolling up and rolling out the tarpaulin 3 over the frame 1 or the roof area. According to the said embodiment of the present invention, by having the switch on of automatic control system including the controller 90, you can have the tarpaulin 3 rolled out over the frame 1 thus covering the roof area and preventing the rain from falling in when it starts raining, and you can also have the tarpaulin 3 rolled up from the frame 1 thus opening the roof area for free ventilation and lighting when it stops raining without bothering a man.

When it rains, in other words, when the tarpaulin 3 is rolled out over the roof area enclosed by the frame 1, the rain water falls from the surface of the tarpaulin 3 over the slider 50 into the lower sidepiece 12, which is formed into a gutter, and therefore another gutter is not needed to prevent rain from splashing. While the motor 8, the fixer 50c and the wheels 50d of the slider 50 as well as the guide rails 60 are all housed in the frame 1 and therefore they are protected from rusting. Further, when the frame 1 is opened by rolling up the tarpaulin 3, as the rain water, dust and other extraneous substance on the surface of the tarpaulin 3 are swept off by the press rollers 6 as well as the cleaning brush 7, corruption and rust of the drum 4 and of its peripheries are prevented.

In addition to the respective elements in the above described embodiment, said belt 30 is substitutable for an endless chain, an endless wire, and/or bar, and said wheels 50d and rail 60 are substitutable for engaging gutters and the like, further, the motor 8 can be substituted for a cylinder.

What is claimed is:

1. An automatically operated opening and closing roof, comprising:

a frame (1) having a pair of spaced sidepieces (11,12) which are connected between a pair of spaced crosspieces (13,14) to define a roof area which is completely rimmed by said frame;

a drum (4) mounted for rotation in one of said sidepieces;

a tarpaulin (3) having an area at least corresponding to said roof area, said tarpaulin having one edge mounted to said drum for rolling said tarpaulin on said drum with rotation of said drum, and an opposite edge;

a guide rail (60) mounted to and extending along at least one of said crosspieces;

a slider (50) fixed to said opposite edge of said tarpaulin and slidably engaged to said guide rail for movement of said slider and said opposite edge of said tarpaulin away from said drum to cover said roof area and toward said drum to uncover said roof area, with sliding of said slider along said guide rail and rotation of said drum;

a pair of spaced apart gears (20,40) mounted for rotation in one of said crosspieces;

a castellated endless belt (30) engaged around and between said gears for movement of said belt with rotation of said gears, said slider being fixed at a selected location to said belt, said selected location moving along said one crosspiece with rotation of said gears for moving said slider along said one crosspiece;

drive means (8) connected to at least one of said gears and mounted in a watertight box connected to said frame;

a rain sensor (70) for detecting rain, mounted to said frame;

a controller (90) connected between said rain sensor and said drive means for activating said drive means in a forward and a reverse direction as a result of signals from said rain sensor indicating the presence and absence of rain for respectively covering and uncovering said roof area with said tarpaulin; and at least said belt, said gears and at least part of said slider being encased within said one crosspiece for protection against rain.

2. An automatically operated opening and closing roof according to claim 1, wherein said drive means comprises a motor connected to one of said drive gears, said motor also being connected to said drum for simultaneous rotation of said drum with rotation of said one gear to help facilitate rolling and unrolling of said tarpaulin on said drum.

3. An automatically operated opening and closing roof according to claim 2, wherein said one crosspiece has closed sides, a closed top and a bottom opening, said slider having a U-shaped portion (50b) connected to said opposite edge of said tarpaulin and extending into said opening of said crosspiece, said guide rail being defined along one of said sides of said one crosspiece and positioned in said one crosspiece.

4. An automatically operated opening and closing roof according to claim 3, wherein said U-shaped portion has spaced apart upper and lower rollers, said guide rail having upper and lower portions respectively engaged with said upper and lower rollers with said guide rail being between said upper and lower rollers.

5. An automatically operated opening and closing rool according to claim 4, including a pair of drainage rollers rotatably mounted to said sidepiece which carries said roller, for rolling against and cleaning upper and lower surfaces of said tarpaulin and a brush connected to said sidepiece containing said drum for engaging and cleaning an upper surface of said tarpaulin.

6. An automatically operated opening and closing roof according to claim 1, wherein said one crosspiece has closed sides, a closed top and a bottom opening, said slider having a U-shaped portion (50b) connected to said opposite edge of said tarpaulin and extending into said opening, said guide rail being defined along one of said sides of said one crosspiece, in said on crosspiece.

7. An automatically operating opening and closing rool according to claim 6, wherein said U-shaped portion has spaced apart upper and lower rollers, said guide rail having upper and lower portions respectively engaged with said upper and lower rollers, with said guide rail being between said upper and lower rollers.

8. An automatically operated opening and closing roof according to claim 7, including a pair of drainage rollers rotatably mounted to said side piece which carries said roller, for rolling against upper and lower surfaces of said tarpaulin and a brush connected to said sidepiece containing said drum for engaging and cleaning an upper surface of said tarpaulin.

* * * * *